United States Patent [19]
Hasegawa et al.

[11] 3,971,837
[45] July 27, 1976

[54] PROCESS FOR MANUFACTURING A COMPOSITE FOAMED SYNTHETIC RESIN BOWLING PIN

[76] Inventors: Tadashi Hasegawa, 3 Tsukimigaoka Yatomi-cho, Mizuho, Nagoya; Tetsuo Yamaguchi, 57 Hatama Oota-cho, Tokai, both of Japan

[22] Filed: Sept. 10, 1973

[21] Appl. No.: 395,830

[52] U.S. Cl............................... 264/46.6; 264/46.7; 264/255; 264/274; 264/328; 273/82 R
[51] Int. Cl.²......................................... B29D 27/00
[58] Field of Search .................. 264/45, 51, 53, 54, 264/DIG. 16, 274, 46.6, 46.7, 328, 255; 273/63 R, 82 R

[56] References Cited
UNITED STATES PATENTS

| | | |
|---|---|---|
| 2,487,218 | 11/1949 | Brinkmann ..................... 264/274 X |
| 2,737,391 | 3/1956 | Brinkmann ..................... 264/274 X |
| 2,738,977 | 3/1956 | Riley............................... 264/274 X |
| 2,797,923 | 7/1957 | Pettman............................ 273/82 R |
| 2,927,904 | 3/1960 | Cooper ......................... 264/DIG. 16 |
| 3,109,201 | 11/1963 | Dulmage .................... 273/82 R UX |
| 3,147,975 | 9/1964 | Gruss et al. ....................... 273/82 R |
| 3,250,730 | 5/1966 | Palmer......................... 264/DIG. 16 |
| 3,478,134 | 11/1969 | Gruss et al............................. 264/45 |
| 3,619,436 | 11/1971 | Gruss et al........................ 264/51 X |
| 3,626,050 | 12/1971 | Satchell et al. ................. 264/274 X |
| 3,793,415 | 2/1974 | Smith................................... 264/45 |

OTHER PUBLICATIONS

Modern Plastics Encyclopedia, 1970–1971, vol. 47, No. 10A, Sections, "Plastics Properties Chart," Oct. 1970, pp. 782–784.
Bender, Rene J. "Handbook of Foamed Plastics," Libertyville, Ill., Lake Publishing Co., 1965, pp. 137–141.

*Primary Examiner*—Philip Anderson

[57] ABSTRACT

A composite foamed synthetic resin bowling pin is formed by first placing a base support element composed of a disc element and having a central sleeve with a hollow reinforcing tube secured thereto and an annular collar with an outwardly extending transverse flange thereon of lesser diameter than the disc element in one end of an undesired mold cavity. The peripheries of the disc elements and flange are disposed in recesses in the mold cavity wall. A foamable thermosetting resin reaction mixture is cast in the mold cavity and foamed and cured. The resulting assembly is then inserted in second mold of larger diameter and of the size of the final product. A molten thermoplastic resin is then introduced into this second mold cavity to form a thermoplastic shell on the assembly and which shell is interlocked with the collar on the base support element.

7 Claims, 11 Drawing Figures

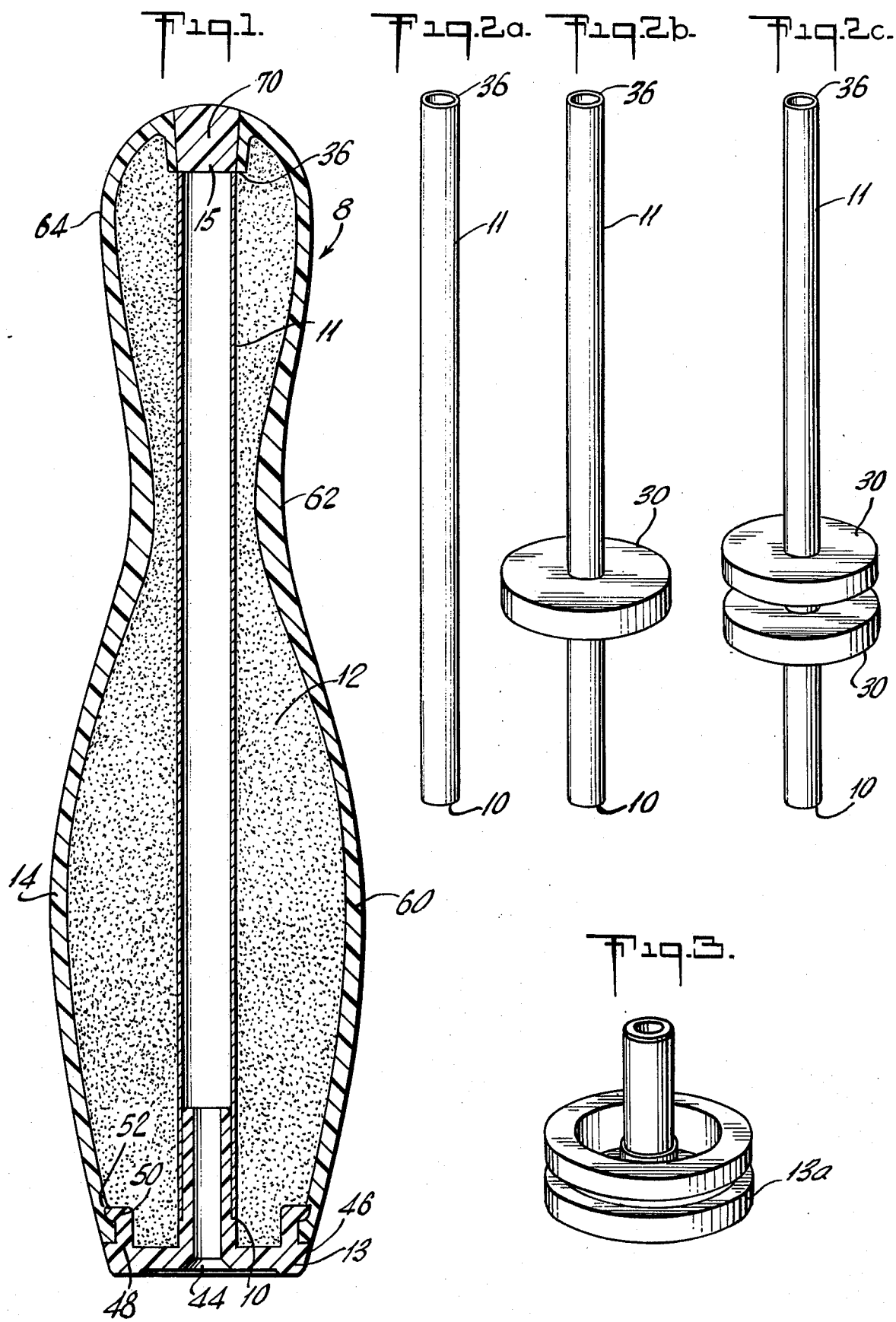

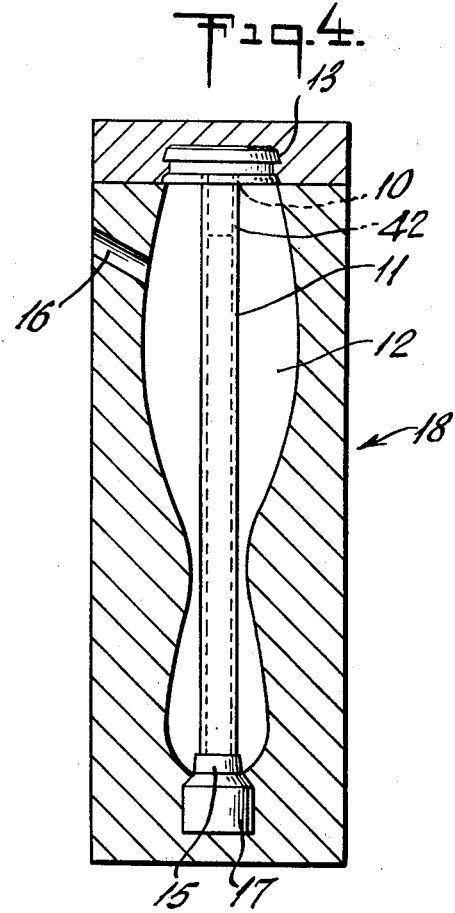
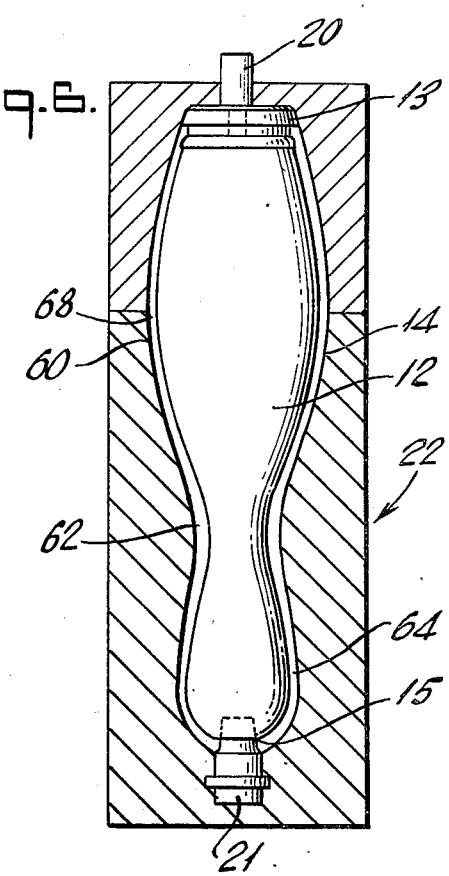
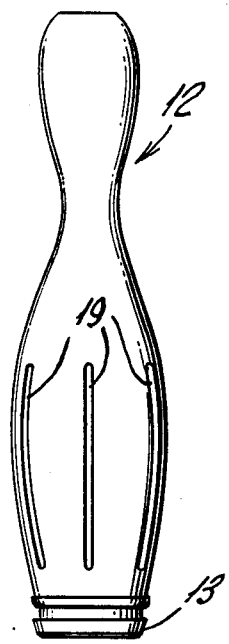
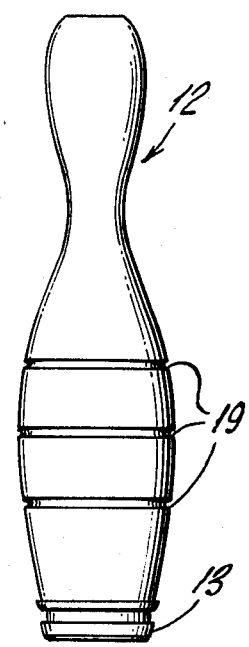
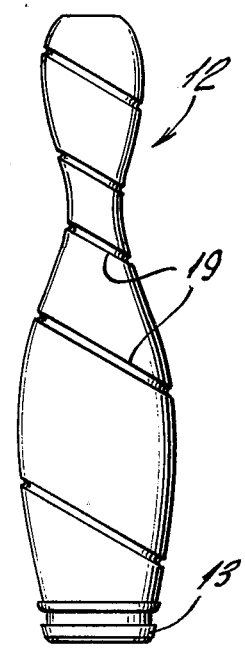
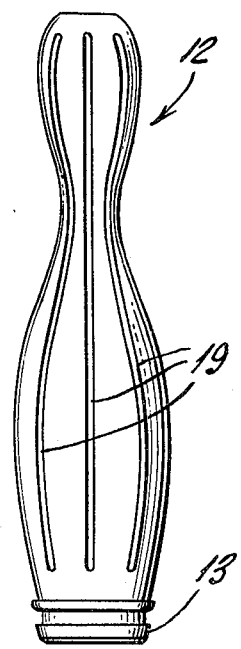

PROCESS FOR MANUFACTURING A COMPOSITE FOAMED SYNTHETIC RESIN BOWLING PIN

Bowling pins have in general been manufactured from wood, especially from maple, providing suitable strength and sound when struck by a bowling ball, as well as durability. The bowling pin market has increased however because of greater usage, and there has resulted a relative lack of maple stock. Therefore, attempts have been made to replace maple, but completely satisfactory results have not been realized. It is said that bowling pins produced by these attempts do not have suitable sound when struck by a bowling ball, and have less strength than maple pins.

It is an object of this invention to provide a method for the manufacture of synthetic bowling pins comparable to maple pins, having a substantially extended useful life span and improved easy maintenance.

The foregoing and other objectives and advantages of the invention will become more apparent from the description appearing hereinafter in conjunction with the accompanying drawings forming part of this application.

IN THE DRAWINGS:

FIG. 1 is a view in longitudinal section of a bowling pin according to the invention.

FIGS. 2a, b and c are perspective views of several forms of a hollow pipe or support employed according to the method of this invention.

FIG. 3 is a perspective view of a modified form of base attachment utilized in the structure shown in FIG. 1.

FIG. 4 is a longitudinal sectional view of a mold containing elements used in making the body of the bowling pin of FIG. 1 according to the practice herein described.

FIGS. 5a, b, c, and d are perspective side views of various discontinuities formed in the surface of the bodies prepared in the mold of FIG. 4 according to the practice herein described.

FIG. 6 is a longitudinal sectional view partly in perspective and partly in section of a mold and bowling pin being produced therein according to the practice of this invention.

Referring now in further detail to the accompanying drawings, a support pipe or tube 11, to one end 10 of which is fastened a base support attachment 13, (or 13a as shown in FIG. 3) is introduced and centered into a first mold 18, as shown in FIG. 4. A quantity of liquid reaction mixture containing principally polyurethane prepolymer sufficient to completely fill the hollow mold 18 when foamed is then poured into the mold and reacted to form a cured cellular polyurethane structure enveloping the length of the pipe or tube 11 and is therefore of the same or similar length to that of the body 12 in which the tube is disposed. That end 15 of the tube opposite from that to which the attachment 13 is fastened is kept open. The body 12 obtained in the manner thus described is introduced into and centered in a second mold 22 suitable for covering the body 12 as shown in FIG. 6 with a solid shell of thermoplastic resin. The body 12 and tube 11 are supported within the mold 22 both at the open end 15 and at the end to which is fastened the base support attachment or element 13. Since the second mold 22 is larger than the first mold 18, but of similar contour, a space exists between the inner walls 24 of the second hollow mold 22 and the surface 25 of the body 12. This space is filled with thermoplastic resin according to wellknown methods of injection molding to form the foregoing solid shell 14. Thereafter, the end 15 of the tube 11 is filled with the same thermoplastic resin employed in the injection molding process just described. The method by which this is accomplished is described further hereinbelow. The outer surface of shell 14 is then coated with at least one layer of a conventional coating lacquer.

Referring more particularly to the method of this invention, the material of the pipe 11 is selected from aluminum steel, fiberglass reinforced plastic, or rigid polyvinylchloride. It is particularly beneficial to employ a steel pipe, with a length of 300 to 360 millimeters, an inner diameter of 10 to 30 millimeters, and a wall thickness of 0.3 to 5 millimeters, because of the suitable sound and impact strength inherent in the materials employed at these dimensions. Not only a straight pipe but structurally improved shapes of the pipe 11, as shown in FIG. 2, are also available, which have a better sound as a result of the expanded disc elements 30 provided.

The attachment 13 as seen in FIG. 1 and the modification thereof shown in FIG. 3, constitute an effective support for the body 12 inside the mold 22 during the injection molding step. The base support attachment 13 reinforces the bowling pin and entirely covers the bottom of the pin. The material of the attachment 13 is selected from nylon 6 or preferably nylon 12.

With particular reference to the initial foaming step for providing the body 12, the pipe 11, upon the end 10 of which is mounted the base support attachment 13, a flattened annular member or disc, is centered within the mold 18 of FIG. 4 and about the plug 17. The upper surface of the base support attachment 13 is modified to form a tubular member or hollow sleeve 42 about the opening 44 defined in axial alignment with and through the attachment 13. The tubular member or sleeve 42 receives the tube 11 in frictional engagement about its periphery. Disposed coaxially about the sleeve 42 and in spaced relation to the outer margin 46 of the base support 13 is an annular collar 48 as shown, for example, in FIG. 1, which is modified to define a transversely disposed cylindrical flange 50 the outer edge 52 of which forms a circumference having a diameter smaller than that of the disc 13. The collar 48 and flange 50 interlock with the shell or housing 14 as described further hereinafter.

A suitable amount of expandable foam-producing resin, a liquid reaction mixture containing a polyurethane prepolymer with less than sixty percent (60%) by weight of a elastomer, is poured into the mold 18 of FIG. 4 through the passage 16 which is thereafter closed. The liquid prepolymer requires about 15 minutes for the steps of foaming and curing, and the resulting cellular product has a specific gravity of about 0.3 to 0.7. It is important in this regard that the pipe be introduced into, and carried within, the mold so as to prevent the passage of rising foam through the apertures defined in the opposite ends 10 and 15 of the hollow pipe 11. This is accomplished by mounting the end 15 of the tube or pipe 11 about the guide or plug 17. The attachment 13 is, as a result, in pressed engagement with the inner wall 54 at the opposite end of the mold 18 preventing the cellular resinous foam composition from defining a path about the attachment 13 into its orifice or opening 44 which is common with the hollowed passage of the tube 11.

The body 12 is preferably provided in the mold 18 with a plurality of preselected surface discontinuities, the bezels or grooves 19, as shown in FIGS. 5a, 5b, 5c and 5d, formed most desirabily by means of a plurality of discontinuous ridges extending into the cavity of the mold defined by the contour of the interior walls of the mold to impart improved bonding and anchoring of the shell 14 to the body 12, upon introduction of thermoplastic resin into the grooves 19, in the injection molding step. To secure an improved flow of molten thermoplastic resin, and in order to prevent "sink marks" upon the surface of the shell 14, the grooves 19 are arranged separately around the circumference of the body 12. The dimensions of each groove or bezel are 0.8 to 1 millimeter in width and 2 to 10 millimeters in depth. Preferably, at least three grooves, as will be evident from FIG. 5 of the drawings, or four grooves or bezels, formed within the mold 18 or in a separate step, are disposed in annular fashion about the circumference of the body 12 and two or three bezels are separately arranged in a generally longitudinal and preferably linear manner along the surface, and paralleling the axis, of the body 12. As will be evident additionally, from the drawings, 5a and 5d, three such grooves may also be disposed along each side of the pin 8.

The body 12 is thereafter introduced into and centered in the second mold 22 and supported therein at its opposite ends by means of resilient or removable guides 20 and 21 inserted in the opening 44 formed about the center of the attachment 13 and the open end 15 of the tube 11, respectively. A molten thermoplastic resin selected from cellulose acetate, ABS, high impact polyethylene, or nylon, is then introduced between the body 12 and the mold walls 24 according to conventional methods employed in insert injection molding to form a hardened solid shell upon cooling which has penetrated and filled the grooves 19 and is continuous with the outer margin 46 of the base support member or attachment 13 and disposed in interlocking engagement with the collar 48 and flange 50. It is particularly beneficial to use cellulose acetate or nylon as the thermoplastic resin herein.

The finished bowling pin comprises a base portion 60, a constricted neck portion 62, and a head portion 64. The thickness of the shell disposed about the foam body in these various portions of the pin will vary most desirably between 2 millimeters and 8 millimeters. This variation in thickness along the length and surface of the pin 8 is accomplished by modifying the contour of the second mold 22 slightly as contrasted with that of the first mold 18 so as to provide an expanded or contracted space where desired between the inner walls 24 of the second mold and the surface of the body 12 formed in the first mold 18. The greatest thicknesses are provided, within the range recited above, adjacent the base support element 13 to assure a firm and substantially unbreakable interlock therewith; and about the neck portion 62 and the most expanded segment 68 of the base portion 60, in order to best protect these latter areas from the impact to which the pin is normally subjected.

It is within the base portion 60 of the pin 8 and most desirably at a level coinciding with the most expanded segment 68 thereof that the tube 11 is, desirably, for reasons of sound and balance expanded to form a plurality of coaxially aligned discs 30, preferably one or two in number, as shown in FIGS. 2b and 2c.

The end 15 of the tube 11 in the head portion 64 of the pin (which has remained open through the injection molding step by virtue of the plug 21 present in the tube end 15) is closed as the last of the sequence of steps employed in the practice of the invention. This closure is accomplished using an abbreviated rod or insert 70 formed of the same thermoplastic resin employed in forming the remainder of the shell 14.

The finished composite pin 8 formed within the larger second mold 22 will have a weight and size equivalent or identical to that of conventional bowling pins made of maple or fashioned by other means.

The following example is further illustrative of this invention:

EXAMPLE

This example illustrates the preparation of bowling pins according to the practice of the invention.

Each of the pins of this example were prepared in the manner described hereinabove using a straight steel pipe with the following dimensions:

| | |
|---|---|
| Inner diameter | 18.3 mm. |
| Wall thickness | 0.8 mm. |
| Length | 350.0 mm. |

Attachments were made from injection molded nylon 12. Foam bodies were provided through a foaming and curing process under the following conditions:

| | |
|---|---|
| Temperature of the liquid prepolymer | 22° C |
| Temperature of the surface of the mold | 45° C |
| Prepolymer out-put at nozzle | 130 grs./second |
| Mixing ratio by weight (diisocyanate: polyol) | 104:100 |
| Speed of mixing unit, revolutions/min. | 6,000 rpm |
| Pouring time | 7 seconds |
| Foaming and curing time (total) | 15 minutes |

Each body was then provided with twelve bezels or grooves separately arranged upon its surface in an annular fashion about its circumference, and two bezels or grooves separately arranged along the length of the body paralleling the steel pipe or tube positioned therein. Thereafter, a solid shell of cellulose acetate was injection molded covering the body under the following conditions:

Conditions of the injection molding machine:

| | |
|---|---|
| Temperature of cylinder | 170° C to 220° C |
| Temperature of nozzle | 200° C |
| Clamping force | 270 tons |
| Injection capacity | 500 grs./shot |
| Injection pressure | 1,000 Kgs./cm² |
| Speed of screw, revolutions/min. | 33 rpm |

The following thicknesses of the solid shell of the pins were measured and determined to be as follows:

| | |
|---|---|
| Base portion of shell adjacent based support attachment | 8 mm. |
| Most expanded segment of the base portion of the pin | 5 mm. |
| Neck portion | 6 mm. |
| Remainder of the shell | 2.5 mm. |

The top end of each pin was filled with a rod or insert made from cellulose acetate. Three layers of transparent coatings were applied to each pin by dipping of the pins into a lacquer formulated principally of cellulose acetate.

Each of the pins obtained in this example had a sound considered most desirable when struck by a bowling ball; a suitable scorability and, as experimentally confirmed, an improved durability against split and dent, in particular.

As many apparently widely different embodiments of this invention may be made without departing from the spirit and scope thereof, it is to be understood that the invention is not limited to the specific embodiments thereof described hereinabove except as defined in the appended claims.

What is claimed is:

1. In a method for producing a bowling pin having a substantially rigid tube, a base support element composed of a flattened disc, one surface of which is modified to form an axially aligned collar and sleeve, to which sleeve is secured one end of said tube, said collar and sleeve being disposed coaxially about an orifice in said disc; said collar being formed in a position intermediate between said sleeve and the outer periphery of said disc, and terminating in a transversely disposed cylindrical flange having a diameter less than that defined by the outer periphery of said disc; a body of expanded resin surrounding said tube and disposed within said collar and the upper surface of the foregoing disc; a shell of solid thermoplastic resin disposed about said body and continuous with the outer periphery of the disc and in interlocking engagement with said disc and flange of said base support element said method comprising the steps of securing said one end of said tube on the sleeve and about the central orifice of said base support element; centering said tube and base support element within a first mold having the contour of an undersized bowling pin in such manner that the outer surface of said disc is in contact with the inner wall of said mold at one end thereof and the outer peripheries of said disc and collar are disposed in recesses in said mold and introducing a foamable thermosetting resin reaction mixture into said mold and about the length of said tube and within the confines of said collar on said base support element; foaming and curing said resin and removing the resulting assembly from said first mold; centering said assembly in a second mold wherein the outer surface of said disc is disposed in contact with an inner end wall of said second mold, said second mold having a larger cross-sectional diameter than said first mold and having a contour similar to that of said first mold so that said assembly is, as a result, in spaced relationship to the interior side walls of said second mold; and, introducing between said side walls and said assembly a molten thermoplastic resin to provide said shell interlocked with said collar of said base support element.

2. The process of claim 1 wherein the interior walls of said first mold are invested with a plurality of ridges extending into the cavity defined by said mold to produce corresponding discontinuities in the surface of said body.

3. The process of claim 1, wherein an insert formed of the same thermoplastic resin as said shell is placed within the end of said tube after the remainder of said shell is formed to provide surface continuity with the remainder of said shell.

4. The process of claim 1 wherein said tube is modified along its length to provide at least one expanded disc within said body.

5. The method of claim 1 wherein the body formed from said expanded resin in said first mold has the general contour of an undersized bowling pin including a base in engagement with said base support element bearing said sleeve and flange-bearing collar; a constricted neck continuous with said base and terminating in an expanded head portion; the shell of thermoplastic resin disposed about said neck and about said base being of increased thickness to that covering the remainder of said bowling pin; said method comprising the steps of introducing said molten thermoplastic resin into said second mold, the side walls of which are further removed from said body about said neck and about said base.

6. The process of claim 5 wherein said tube is made of steel or aluminum and mounted in frictional engagement about the periphery of said sleeve.

7. The process of claim 6 wherein said tube has an inner diameter of 10 millimeters to 30 millimeters and a thickness of 0.3 millimeters to 5 millimeters and wherein said second mold contains a cavity having a cross-sectional diameter of from about 2 millimeters to about 8 millimeters greater than that of said first mold.

* * * * *

United States Patent Office

CERTIFICATE OF CORRECTION

Patent No. 3,971,837          Dated July 27, 1976

Inventor(s) Tadashi Hasegawa and Tetsuo Yamaguchi

It is certified that error appears in the above-identified patent and that said Letters Patent are hereby corrected as shown below:

ABSTRACT, line 7, cancel "undesired" and substitute

--undersized--

Signed and Sealed this

Twenty-third Day of November 1976

[SEAL]

Attest:

RUTH C. MASON
Attesting Officer

C. MARSHALL DANN
Commissioner of Patents and Trademarks